(12) United States Patent
Miller et al.

(10) Patent No.: US 9,575,250 B2
(45) Date of Patent: Feb. 21, 2017

(54) DIRECT WRITABLE AND ERASABLE WAVEGUIDES IN OPTOELECTRONIC SYSTEMS

(71) Applicant: Empire Technology Development LLC, Wilmington, DE (US)

(72) Inventors: Seth Adrian Miller, Englewood, CO (US); Gary Lynn Duerksen, Ward, CO (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/324,074

(22) Filed: Jul. 3, 2014

(65) Prior Publication Data

US 2016/0004010 A1 Jan. 7, 2016

(51) Int. Cl.
*G02B 6/10* (2006.01)
*G02B 6/138* (2006.01)

(52) U.S. Cl.
CPC .................................. *G02B 6/138* (2013.01)

(58) Field of Classification Search
CPC ................................ G02B 6/13; G02B 3/0087
See application file for complete search history.

(56) References Cited

U.S. PATENT DOCUMENTS

| | | | |
|---|---|---|---|
| 5,046,800 A * | 9/1991 | Blyler, Jr. ................ | G02B 6/13 264/1.7 |
| 5,124,417 A | 6/1992 | Farooq | |
| 5,917,006 A | 6/1999 | Smith et al. | |
| 6,058,228 A * | 5/2000 | Fasanella ............ | G02B 6/2817 385/16 |
| 6,363,097 B1 | 3/2002 | Linke et al. | |

(Continued)

OTHER PUBLICATIONS

Ameduri, B., et al., "From Vinylidene Fluoride (VDF) to the Applications of VDF-Containing Polymers and Copolymers: Recent Developments and Future Trends," Chem. Rev vol. 109, No. 12, pp. 6632-6686 (2009).

(Continued)

*Primary Examiner* — Sung Pak
*Assistant Examiner* — Hoang Tran
(74) *Attorney, Agent, or Firm* — Turk IP Law, LLC

(57) ABSTRACT

Technologies are generally described to form a waveguide in a polymer multilayer comprising a first and second polymer layer. The waveguide may be formed by directing light beams toward the polymer multilayer to form first and second cladding regions in the polymer multilayer, where the first and second cladding regions comprise a mixture of the first and second polymer layers. The first and second cladding regions may define a third cladding region and a waveguide core therebetween, where the third cladding region comprises a portion of the second polymer layer, and the waveguide core comprises a portion of the first polymer layer. In some examples, the polymer multilayer may be formed on a substrate such that the waveguide is formed on the substrate. Additionally, the waveguide may be formed temporarily to test components of an optoelectronic system and then erased by heating the polymer multilayer to destroy the waveguide core, or the waveguide may be formed as a default optical interconnection configuration that may be changed to alter the functional mode of the backplane in the manner of a jumper setting.

19 Claims, 8 Drawing Sheets

(56) References Cited

U.S. PATENT DOCUMENTS

| | | | |
|---|---|---|---|
| 6,681,067 | B1 | 1/2004 | Kersey |
| 6,785,439 | B2 | 8/2004 | Hoke et al. |
| 7,181,114 | B2 | 2/2007 | Lee et al. |
| 7,389,029 | B2 | 6/2008 | Rahman et al. |
| 7,390,532 | B2* | 6/2008 | Dellwo .............. C08F 283/12 359/290 |
| 7,738,752 | B2 | 6/2010 | Yamagiwa et al. |
| 8,017,193 | B1 | 9/2011 | Zhou et al. |
| 8,380,027 | B2 | 2/2013 | Reed et al. |
| 8,540,899 | B2 | 9/2013 | Miller |
| 2003/0055120 | A1 | 3/2003 | Blomquist |
| 2004/0155517 | A1 | 8/2004 | Stupp et al. |
| 2004/0233526 | A1 | 11/2004 | Kaminsky et al. |
| 2006/0165368 | A1* | 7/2006 | Colombo .............. C08G 61/123 385/141 |
| 2006/0216508 | A1 | 9/2006 | Denisyuk et al. |
| 2008/0209876 | A1 | 9/2008 | Miller |
| 2009/0238514 | A1* | 9/2009 | Hu ....................... G02B 6/1221 385/12 |
| 2010/0004389 | A1 | 1/2010 | Paley et al. |
| 2011/0085773 | A1 | 4/2011 | Kim |
| 2011/0170210 | A1 | 7/2011 | Helvajian |
| 2011/0242631 | A1 | 10/2011 | Oliveira et al. |
| 2012/0155819 | A1 | 6/2012 | Hirayama et al. |
| 2012/0262664 | A1 | 10/2012 | Kues et al. |
| 2014/0378587 | A1 | 12/2014 | Weiher et al. |

OTHER PUBLICATIONS

Deng, K.-L., et al., "Self-Aligned Single-Mode Polymer Waveguide Interconnections for Efficient Chip-to-Chip Optical Coupling," IEEE Journal of Selected Topics in Quantum Electronics, vol. 12, No. 5, pp. 923-929 (2006).

International Search Report and Written Opinion for International Application No. PCT/US 13/46667 mailed on Jan. 17, 2014.

Jisha, C. P., et al., "Self-written waveguide in methylene blue sensitized poly(vinyl alcohol)/acrylamide photopolymer material," Applied Optics, vol. 47, No. 35, 10, pp. 6502-6507 (2008).

Kagami, M., et al., "Light-Induced Self-Written Optical Waveguides," IEICE Trans. Electron., vol. E90-C, No. 5, pp. 1061-1070 (2007).

Kang, B., et al, "Microelectrode fabrication by laser direct curing of tiny nanoparticle self-generated from organometallic ink," Optics Express, vol. 19, No. 3, pp. 2573-2579 (2011).

Loiacono, R. "Laser erasable implanted gratings for integrated silicon photonics," Optics Express, vol. 19, No. 11, pp. 10728-10734 (2011).

Manabu, K., et al., "Light-induced self-written three-dimensional optical waveguide," Applied Physics Letters, vol. 79, No. 8, pp. 1079-1081 (2001).

Mizeikis, V., et al., "Direct Laser Writing: Versatile Tool for Microfabrication of Lithium Niobate," JLMN—Journal of Laser Micro/Nanoengineering, vol. 7, No. 3, pp. 345-350 (2012).

Mogens, R. P. et al., "Advances in silica-based integrated optics," Opt. Eng., vol. 42, Issue 10, pp. 2821-2834 (2003).

Obata, Y., et al., "Self-written waveguide on a VCSEL-emitting window using a photomask transfer method," IEEE Photonics Technology Letters, vol. 18, No. 12, pp. 1308-1310 (2006).

Song, J.Y et al., "Review of gel-type polymer electrolytes for lithium-ion batteries," Journal of Power Sources, vol. 77, Issue 2, pp. 183-197 (1999).

Svalgaard, M., Direct writing of planar waveguide power splitters and directional couplers using a focused ultraviolet laser beam, Electronics Letters, vol. 33, Issue 20, pp. 1694-1695 (1997).

Tomic, D. and Mickelson, A., "Photobleaching for Optical Waveguide Formation in a Guest-Host Polyimide," Applied Optics, vol. 38, No. 18, pp. 3893-3903 (1999).

Walls, H. J., et al., "Nanocomposite Electrolytes with Fumed Silica and Hectorite Clay Networks: Passive versus Active Fillers," Advanced Functional Materials, vol. 13, No. 9, pp. 710-717, (2003).

Walls, H.J., et al., "Fumed silica-based composite polymer electrolytes: synthesis, rheology, and electrochemistry," Journal of Power Sources, vol. 89, 156-162 (2000).

Wang, P., et al., "Gelation of Ionic Liquid-Based Electrolytes with Silica Nanoparticles for Quasi-Solid-State Dye-Sensitized Solar Cells," J. Am. Chem. Soc., vol. 125, pp. 1166-1167 (2003).

Yamashita, T., et al., "Fabrication of Self-Written Polymeric Waveguides Using Near-Infrared Light From Single-Mode Devices," 17th Micro opics Conference (MOC'11), pp. 1-2 (2011).

Zhao, P., et al., "Novel multimode coupler switch," Microwave and Optical Technology Letters, vol. 17, pp. 1-7 (1998).

"Dodecyl and tetradecyl glycidyl ethers," Sigma-Aldrich, accessed at http://www.sigmaaldrich.com/catalog/product/aldrich/412848?lang=en&region=IN, pp. 2 (2006).

"Epoxy Resins Product Overview," accessed at https://web.archive.org/web/20140527055435/http://msdssearch.dow.com/PublishedLiteratureDOWCOM/dh_01f5/0901b803801157b6.pdf?filepat%20h=epoxy/pdfs/noreg/296-01684.pdf&fromPage=GetDoc, accessed on Jan. 21, 2016, pp. 4.

"Glycidyl 4-nonylphenyl ether," Sigma-Aldrich, accessed at http://www.sigmaaldrich.com/catalog/product/aldrich/430277?lang=en&region=IN, pp. 3 (2006).

"H-Nu Visible Light & Infrared Photoinitiators," accessed at https://web.archive.org/web/20120609181659/http://www.sglinc.com/photoin.htm, Apr. 23, 2012, pp. 5.

Barrett, C., et al., "Photo inscription of channel waveguides and grating couplers in azobenzene polymer thin films," Proc. SPIE 3006, Optoelectronic Integrated Circuits, pp. 441-449 (1997).

Kogelnik, H., "Coupled Wave Theory for Thick Hologram Gratings," Bell System Technical Journal, vol. 48, No. 9, pp. 2909-2947 (Nov. 1969).

Lausten, R., et al., "Optically reconfigurable azobenzene polymer-based fiber Bragg filter," Applied Optics, vol. 44, Issue 33, pp. 7039-7042 (Nov. 20, 2005).

Nioda, A., and Watanabe, M., "Highly conductive polymer electrolytes prepared by in situ polymerization of vinyl monomers in room temperature molten salts," Electrochimica Acta, vol. 45, Issues 8-9, pp. 1265-1270 (Jan. 3, 2000).

Parker, R.M., et al., "Using the photoinduced reversible refractive-index change of an azobenzene co-polymer to reconfigure an optical Bragg grating," Journal of Materials Chemistry, vol. 20, Issue 41, pp. 9118-9125 (2010).

Phillips, N.J., "Photopolymers and Holograms," De Montfort Univ., Leicester, United Kingdom (1997).

Savas, T.A., et al., "Large-area achromatic interferometric lithography for 100 nm period gratings and grids," Journal of Vacuum Science & Technology B, vol. 14, No. 6, pp. 4167-4170 (Nov.-Dec. 1996).

Trout, T.J., et al., "Optical photopolymers: design and applications," Advanced Materials, vol. 10, No. 15, pp. 1219-1224 (Oct. 1998).

Richter, A.K., and Carlson, F.P., "Guided Waves in Alkali-Halide Films," Technical report, pp. 1-22 (Dec. 1976).

\* cited by examiner

COMPUTER PROGRAM PRODUCT 700

SIGNAL BEARING MEDIUM 702

704 AT LEAST ONE OR MORE INSTRUCTIONS TO
FORM A POLYMER MULTILAYER INCLUDING A FIRST POLYMER LAYER AND A SECOND POLYMER LAYER ON A SUBSTRATE;
WRITE A FIRST CLADDING REGION BY DIRECTING A FIRST LIGHT BEAM TO INDUCE MIXING OF THE FIRST AND SECOND POLYMER LAYERS WITHIN THE FIRST CLADDING REGION;
WRITE A SECOND CLADDING REGION BY DIRECTING A SECOND LIGHT BEAM TO INDUCE MIXING OF THE FIRST AND SECOND POLYMER LAYERS WITHIN THE SECOND CLADDING REGION TO FORM A WAVEGUIDE THAT INCLUDES A WAVEGUIDE CORE COMPRISING A PORTION OF THE FIRST POLYMER LAYER LOCATED BETWEEN THE FIRST AND SECOND CLADDING REGIONS AND A THIRD CLADDING REGION COMPRISING A PORTION OF THE SECOND POLYMER LAYER LOCATED BETWEEN THE FIRST AND SECOND CLADDING REGIONS;
IF THE WAVEGUIDE FORMED IS TEMPORARY, ERASE THE TEMPORARY WAVEGUIDE BY HEATING THE POLYMER MULTILAYER TO DESTROY THE WAVEGUIDE CORE; AND CURE THE SUBSTRATE TO PERMANENTLY WRITE THE WAVEGUIDE FORMED.

| COMPUTER-READABLE MEDIUM 706 | RECORDABLE MEDIUM 708 | COMMUNICATIONS MEDIUM 710 |

FIG. 7

DIRECT WRITABLE AND ERASABLE WAVEGUIDES IN OPTOELECTRONIC SYSTEMS

BACKGROUND

Unless otherwise indicated herein, the materials described in this section are not prior art to the claims in this application and are not admitted to be prior art by inclusion in this section.

Waveguides are increasingly being used as high capacity interconnects between one or more optical and/or electrical components of optoelectronic systems, such as printed circuit boards (PCBs). Integration of the waveguides may create challenges in component alignment during assembly, and verification and test after assembly of the PCBs. For example, a technology used to fabricate the high capacity interconnects may need to provide similar design-for-test capabilities as PCBs, which incorporate on-board test points and probe ports to enable verification and testing, in order for optical interconnection technology to be successfully integrated with high-volume PCBs.

An obstacle to implementing such test points and probe ports may be that a presence of a test point or port in a waveguide may impact a functioning of the PCB, even when the test point or port is not being used. Accordingly, current techniques to form waveguides could use improvements and/or alternative or additional solutions in order to form a waveguide that may provide testing, and verification capabilities during assembly by means of selective routing that may be reconfigured after assembly to permit different operation modes of the optoelectronic system. This functional capability is the optical waveguide equivalent to an electronic jumper on a circuit board.

SUMMARY

The present disclosure generally describes techniques to form a waveguide in a polymer multilayer and/or substrate that may optionally be erased or reconfigured.

According to some examples, methods to form a waveguide are provided. An example method may include providing a polymer multilayer. The polymer multilayer may include a first polymer layer and a second polymer layer, where the first polymer layer has a first refractive index and the second polymer layer has a second refractive index, the second refractive index being lower than the first refractive index. The example method may also include writing a first cladding region by directing a first light beam onto the polymer multilayer to induce mixing of the first and second polymer layers within the first cladding region, and writing a second cladding region by directing a second light beam on the polymer multilayer to induce mixing of the first and second polymer layers within the second cladding region, such that the waveguide is formed. A waveguide core may comprise a portion of the first polymer layer located between the first cladding region and the second cladding region, and a third cladding region may comprise a portion of the second polymer layer located between the first cladding region and the second cladding region.

According to other examples, waveguides are described. An example waveguide may include a first cladding region formed by directing a first light beam to induce mixing of a first polymer layer and a second polymer layer within the first cladding region, and a second cladding region formed by directing a second light beam to induce mixing of the first and second polymer layers within the second cladding region. The example waveguide may also include a waveguide core comprising a portion of the first polymer layer located between the first cladding region and the second cladding region, and a third cladding region comprising a portion of the second polymer layer located between the first cladding region and the second cladding region.

In further examples, the types of waveguide structures formed permit light initially to be routed from one waveguide to a second waveguide port by means of a waveguide coupler, and after erasure of selected portions of waveguide formed in the coupling structure, light may be routed to a third port among two or more ports, which is select by erasing the appropriate section of waveguide. In this manner, an "optical jumper" is created that permits the selection of an alternate configuration of the optical interconnection on the optical backplane.

According to further examples, systems configured to form a waveguide on a substrate are described. An example system may include a formation module configured to form a first polymer layer on the substrate, the first polymer layer having a first refractive index, and form a second polymer layer on the first polymer layer, the second polymer layer having a second refractive index, where the second refractive index may be lower than the first refractive index. The example system may also have a writing module configured to form a first cladding region by directing a first light beam to induce mixing of the first and second polymer layers within the first cladding region, and form a second cladding region by directing a second light beam to induce mixing of the first and second polymer layers within the second cladding region, the waveguide comprising the first and second cladding regions, a waveguide core comprising a portion of the first polymer layer located between the first cladding region and the second cladding region, and a third cladding region comprising a portion of the second polymer layer located between the first cladding region and the second cladding region. The example system may further include a controller configured to coordinate one or more operations of the formation module and the writing module.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a block diagram of an example computer program product, all arranged in accordance with at least some embodiments described herein.

DETAILED DESCRIPTION

Figure 1A:
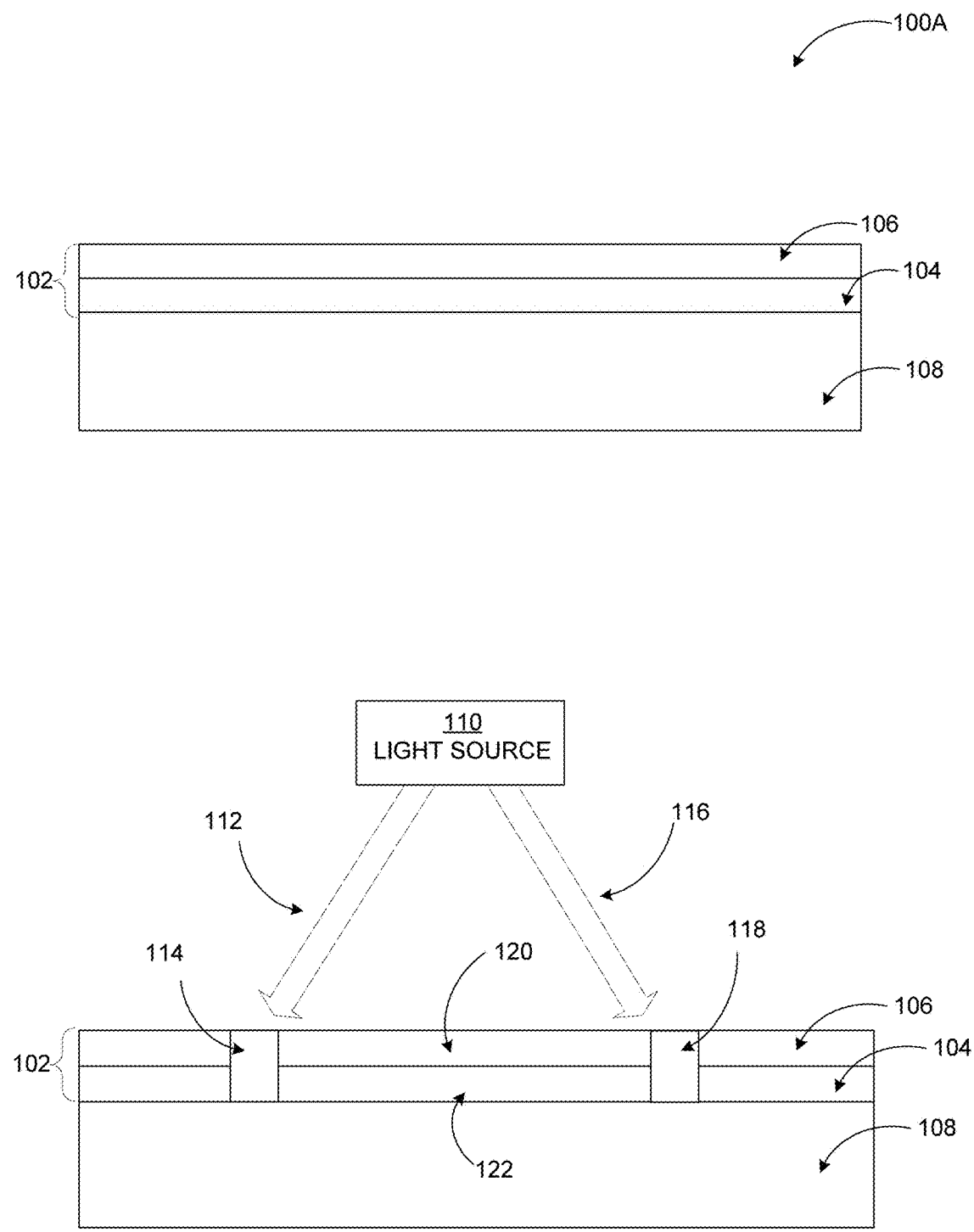
FIG. 1A illustrates an example process to form a waveguide in a polymer multilayer.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to formation of a waveguide in a polymer multilayer and/or substrate that may optionally be erased.

Briefly stated, technologies are generally described to form a waveguide in a polymer multilayer comprising a first and second polymer layer. The waveguide may be formed by directing light beams toward the polymer multilayer to form first and second cladding regions in the polymer multilayer, where the first and second cladding regions comprise a mixture of the first and second polymer layers. The first and second cladding regions may define a third cladding region and a waveguide core therebetween, where the third cladding region comprises a portion of the second polymer layer, and the waveguide core comprises a portion of the first polymer layer. In some examples, the polymer multilayer may be formed on a substrate such that the waveguide is formed on the substrate. Additionally, the waveguide may be formed temporarily to test components of an optoelectronic system and then erased by heating the polymer multilayer to destroy the waveguide core.

FIG. 1A illustrates an example process to form a waveguide in a polymer multilayer, arranged in accordance with at least some embodiments described herein.

As shown in diagram 100A, a polymer multilayer 102 may include a first polymer layer 104 and a second polymer layer 106. In some embodiments, the first polymer layer may be formed on a substrate 108, such as a backplane. A light source 110, such as an infrared (IR) laser, may be configured to direct a first light beam 112 to write a first cladding region 114, and a second light beam 116 to write a second cladding region 118 in the polymer multilayer 102 in order to form a waveguide that further includes a third cladding region 120 and a waveguide core 122 defined by the first and second cladding regions.

The first and second polymer layers of the polymer multilayer 102 may be selected based on a refractive index difference between the first and second polymer layers. For example, the first polymer layer 104 may have a first refractive index of n=1.49 and the second polymer layer 106 may have a second refractive index of n=1.42, where the first refractive index is greater than the second refractive index. The first and second polymer layers of the polymer multilayer 102 may be further selected such that the first and second polymer layers are mutually soluble in response to a provision of heat. The first polymer layer 104 may consist essentially of an acrylate polymer, such as poly(methyl methacrylate) (PMMA), and the second polymer layer 106 may consist essentially of a fluoropolymer, such as polyvinylidene fluoride (PVDF), for example. The first polymer layer 104 may be formed on the substrate 108 and the first polymer layer 104 may be laminated onto the second polymer layer 106.

The first cladding region 114 and the second cladding region 118 may be a pair of generally parallel and elongated cladding regions within the polymer multilayer 102. The direction of the first light beam 112 and second light beam 116 may induce mixing of the first polymer layer 104 and the second polymer layer 106 to form the first cladding region 114 and the second cladding region 118, respectively. In response to the direction of the first light beam 112 and the second light beam 116, the first polymer layer 104 and the second polymer layer 106 may be heated to a liquid state within the first cladding region 114 and the second cladding region 118, respectively. The induction of mixing of the first polymer layer 104 and the second polymer layer 106 may be due to properties of the first and second polymer layers in the liquid state that energetically favor the mixing causing the mutually soluble nature of the first and second polymer layers as described above. Accordingly, the refractive indices of the first and second cladding regions may be less than the first refractive index of the first polymer layer 104 and greater than the second refractive index of the second polymer layer 106. For example, the refractive indices of the first and second cladding regions may be n=1.44. The first and second light beams may be provided in a visible, infrared, or ultraviolet light spectra. Alternately, the first and second light beams may be provided by steering a laser beam, where the laser beam has a wavelength of about 390 nm to about 980 nm.

The third cladding region 120 may include a portion of the second polymer layer 106 located between the first cladding region 114 and the second cladding region 118. A refractive index of the third cladding region 120 may be substantially equal to the second refractive index of the second polymer layer. The waveguide core 122 may include a portion of the first polymer layer 104 located between the first cladding region 114 and the second cladding region 118. A core refractive index of the waveguide core 122 may be substantially equal to the first refractive index of the first polymer layer 104, and may be greater than the refractive index of the first, second, and third cladding regions. Accordingly, the waveguide core 122 may enable light to be confined in the first polymer layer 104 of greater refractive index surrounded by the first, second, and third cladding regions of lesser refractive index. Each refractive index may be measured at the operating wavelength of the waveguide.

Figure 1B:
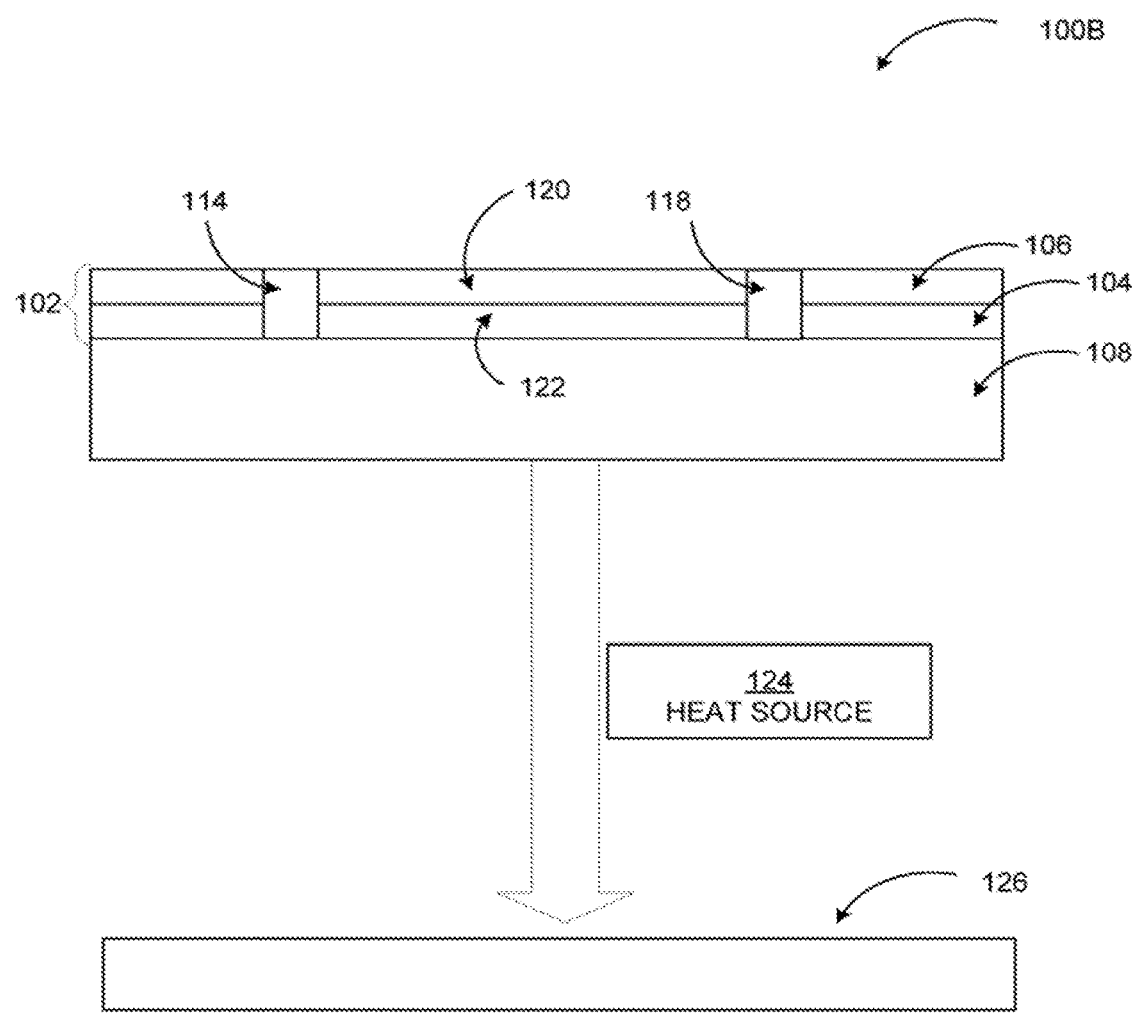
FIG. 1B illustrates an example process to erase a temporary waveguide formed in a polymer multilayer.

FIG. 1B illustrates an example process to erase a temporary section of waveguide formed in a polymer multilayer, arranged in accordance with at least some embodiments described herein.

As shown in diagram 100B, a polymer multilayer 102, including a first polymer layer 104 and a second polymer layer 106, may be formed on a substrate 108 such that a waveguide formed in the polymer multilayer 102 may be formed on the substrate 108. The waveguide formed may include a first cladding region 114, a second cladding region 118, a third cladding region 120, and a waveguide core 122. The first cladding region 114 and the second cladding region 118 may include a mixture of the first polymer layer 104 and the second polymer layer 106. The third cladding region 120 may include a portion of the second polymer layer 106 located between the first cladding region 114 and the second cladding region 118. The waveguide core 122 may include a portion of the first polymer layer 104 located between the first cladding region 114 and the second cladding region 118.

The waveguide formed may be temporary. For example, one or more optical components located on the substrate 108 may be tested by directing light into the optical components using the temporary waveguide. Once the temporary waveguide has been used to test the optical components, the temporary waveguide may be effectively erased by providing heat from a heat source 124 to the polymer multilayer 102 to destroy the waveguide core 122. As the polymer multilayer 102 is heated, the first and second polymer layers, which are mutually soluble in response to a provision of heat, may uniformly solubilize causing the waveguide core 122 to be destroyed, as illustrated in configuration 126.

The waveguide formed may be reconfigurable. For example, one or more alternate configurations of the backplane interconnections may be selected in accordance with the desired operational mode of the circuit. The initial configuration may provide for measurement capability during test and verification at the time of manufacture, which is reconfigured to permit normal operation of the circuit after testing, or the initial configuration may represent a default optical interconnection configuration that can be reconfigured to one or more alternative optical interconnection configurations that result in different functional modes, in a manner similar to a jumper in an electrical circuit.

In one embodiment, the heat from the heat source 124 may be rapidly provided to an entirety of the polymer multilayer 102 at a temperature above the melting points of the first and second polymers, essentially comprising the first and second polymer layers. For example, if the first polymer layer 104 essentially consists of PMMA (melting point of 160° C.) and the second polymer layer 106 consists essentially of PDVF (melting point of 177° C.), the temperature at which the heat is provided may be about 180° C. or higher. In another embodiment, heat from the heat source 124 may be provided locally to the first, second, and/or third cladding regions of the polymer multilayer in order to destroy the waveguide core 122. By providing localized heat, other components of the polymer multilayer 102 and/or substrate 108 may be unaffected. In some examples, the heat source 124 may be an optical source such as an infrared (IR) laser.

In other examples, the first polymer layer 104 and/or the second polymer layer 106 may include nanoparticles in order to preserve a physical structure of the polymer multilayer 102 when one or more portions of the first polymer layer 104 and/or the second polymer layer 106 are heated to a liquid state. For example, when the first polymer layer 104 and/or the second polymer layer 106 are heated to a liquid state in response to the directed first light beam 112 and second light beam 116 in order to induce mixing of the first polymer layer 104 and the second polymer layer 106 to form the first cladding region 114 and the second cladding region 118, respectively. Or in another example, when the first polymer layer 104 and/or the second polymer layer 106 are heated to a liquid state by the heat source 124 in order to erase a temporary waveguide formed within the polymer multilayer 102. Furthermore, the nanoparticles may keep the first and second polymer layers in a gelled state during solubilization so they maintain their mechanical stability and no dewetting or warping of the first and second polymer layers occurs. The presence of nanoparticles may further enable a refractive index of the first and second polymer layers to be adjusted as desired. The nanoparticles may be loaded at 5% or greater, and may comprise fumed silica, acidic silica, alumina, titania, or ceria, for example. The nanoparticles may further be dielectric.

Figure 2:
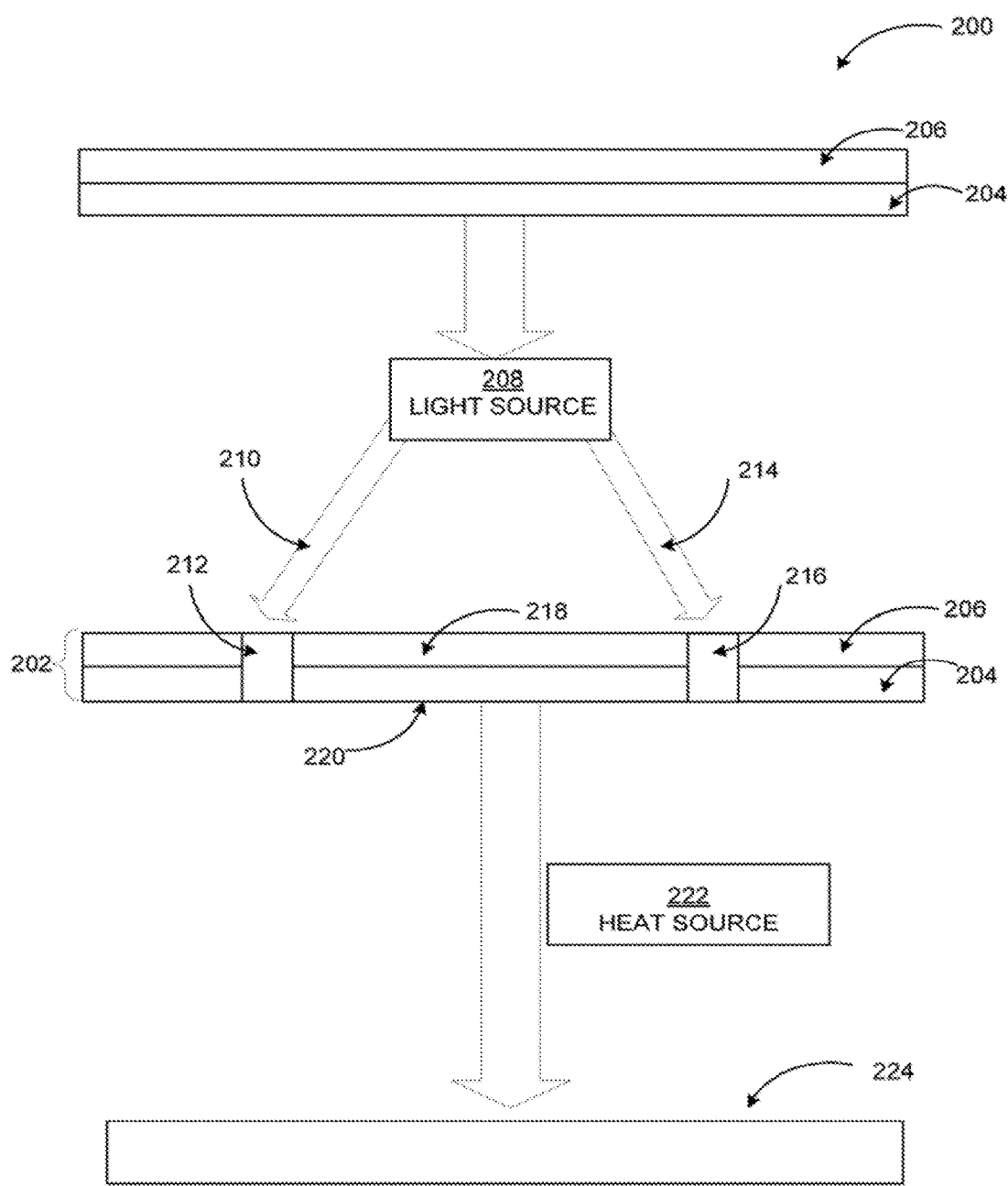
FIG. 2 illustrates an example process to initially form and subsequently erase a temporary waveguide in a polymer multilayer.

FIG. 2 illustrates an example process to initially form and subsequently erase a temporary waveguide in a polymer multilayer, arranged in accordance with at least some embodiments described herein.

As shown in a diagram 200, a polymer multilayer 202 may include a first polymer layer 204 and a second polymer layer 206. Laser radiation may be directed towards the polymer multilayer to define cladding regions (e.g., 212, 216, 218) in the polymer multilayer 202, the cladding regions defining a waveguide core 220 therebetween in order to form a waveguide. For example, a light source 208 may be configured to direct a first light beam 210 to write a first cladding region 212, and a second light beam 214 to write a second cladding region 216 in the polymer multilayer 202 in order to form a waveguide, where each cladding region may be a mixture of the first polymer layer 204 and the second polymer layer 206. The waveguide may further include a third cladding region 218 and a waveguide core 220 defined by the first and second cladding regions. The third cladding region 218 may include a portion of the second polymer layer 206 located between the first cladding region 212 and the second cladding region 216. The waveguide core 220 may include a portion of the first polymer layer 204 located between the first cladding region 212 and the second cladding region 216. In some examples, the waveguide formed may be located within a sheet, the sheet including the waveguide and the polymer multilayer 102 on each side of the waveguide, as illustrated in the diagram 200.

The waveguide formed may be temporary. For example, one or more optical components may be tested by directing light into the optical components using the temporary waveguide. Once the temporary waveguide has been used to test the optical components, the temporary waveguide may be erased by applying heat from heat source 222 to the polymer multilayer 202 to destroy the waveguide core 220. As the polymer multilayer 202 is heated, the first and second polymer layers, which are mutually soluble in response to a provision of heat, may uniformly solubilize causing the waveguide core 220 to be destroyed, as illustrated in configuration 224.

The waveguide may be permanent, but the permanent state is selected post manufacture. For example, a default optical interconnection may be provided by the initial waveguide configuration that supports one functionality, which may be left intact if that functionality is appropriate to the intended application. Conversely, one or more alternative waveguide configurations may be selected by erasing appropriate sections of the waveguide in a multi-mode interference coupler (MMI), for example, which support different functionalities appropriate to the intended application.

Figure 3:
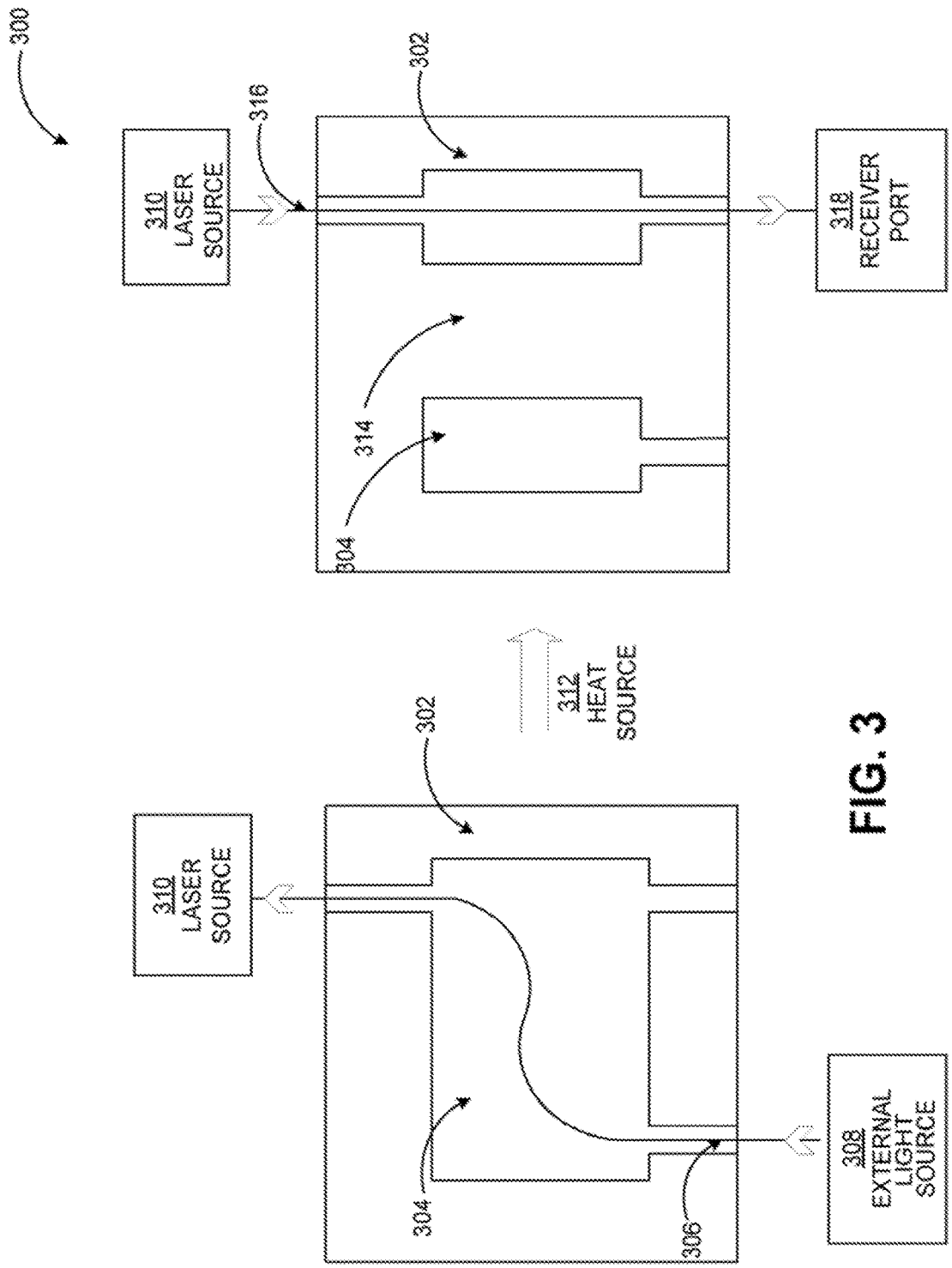
FIG. 3 illustrates an example optoelectronic system in which a reconfigurable waveguide couple may be formed that permits the selection of one or more different waveguide interconnections after the initial test and verification of the PCB.

FIG. 3 illustrates an example optoelectronic system in which a temporary waveguide may be formed to test an optical component, arranged in accordance with at least some embodiments described herein. The coupling structures that provide this reconfigurability may be multi-mode interference couplers.

As shown in diagram 300, an optical component 304 may be prefabricated in a polymer multilayer 302, the polymer multilayer 302 including a first polymer layer of a higher refractive index and a second polymer layer of a lower refractive index. A temporary waveguide 306 may be formed in the polymer multilayer 302 in order to test the optical component 304 by directing light from an external light source 308 into the optical component 304 using the temporary waveguide 306. After the optical component 304 is tested, the temporary waveguide 306 may be erased by heating at least a portion of the polymer multilayer 302 with heat from a heat source 312 to destroy the waveguide core of the temporary waveguide 306. The temporary waveguide 306 may be erased to prevent the waveguide from impacting operations of the optical component and/or other components of the polymer multilayer 302.

The temporary waveguide 306 may be formed in the polymer multilayer 302 as described above in FIG. 2, such that the waveguide includes first, second, and third cladding regions and a waveguide core. The external light source 308 may direct light into the optical component 304, such as a directional coupler, to test the optical component's capability of coupling an external component to a laser source 310 component of the polymer multilayer 302 through the temporary waveguide 306. Once tested, the heat source 312 may provide heat to a localized region 314 of the polymer multilayer 302. As the localized region 314 of the polymer multilayer 302 is heated, the first and second polymer layer may uniformly solubilize in the localized region 314, causing the waveguide core of the temporary waveguide 306 to be destroyed and thus, the temporary waveguide 306 to be erased. Furthermore, the external light source 308 and the laser source 310 component may be de-coupled. By providing heat to the localized region 314, the temporary waveguide may be erased without affecting other components of the polymer multilayer 302, such as other optical components and/or waveguides. As a result, the optical component 304 may then couple the laser source 310 to a receiver port 318 through a waveguide 316 formed in the polymer multilayer 302. The waveguide 316 may then be permanently written by curing the polymer multilayer 302. Other example optical components that may be tested by a temporary waveguide may include an out-of-plane coupler, an in-plane Y-coupler, or a graded-index waveguide profile.

Figure 4:
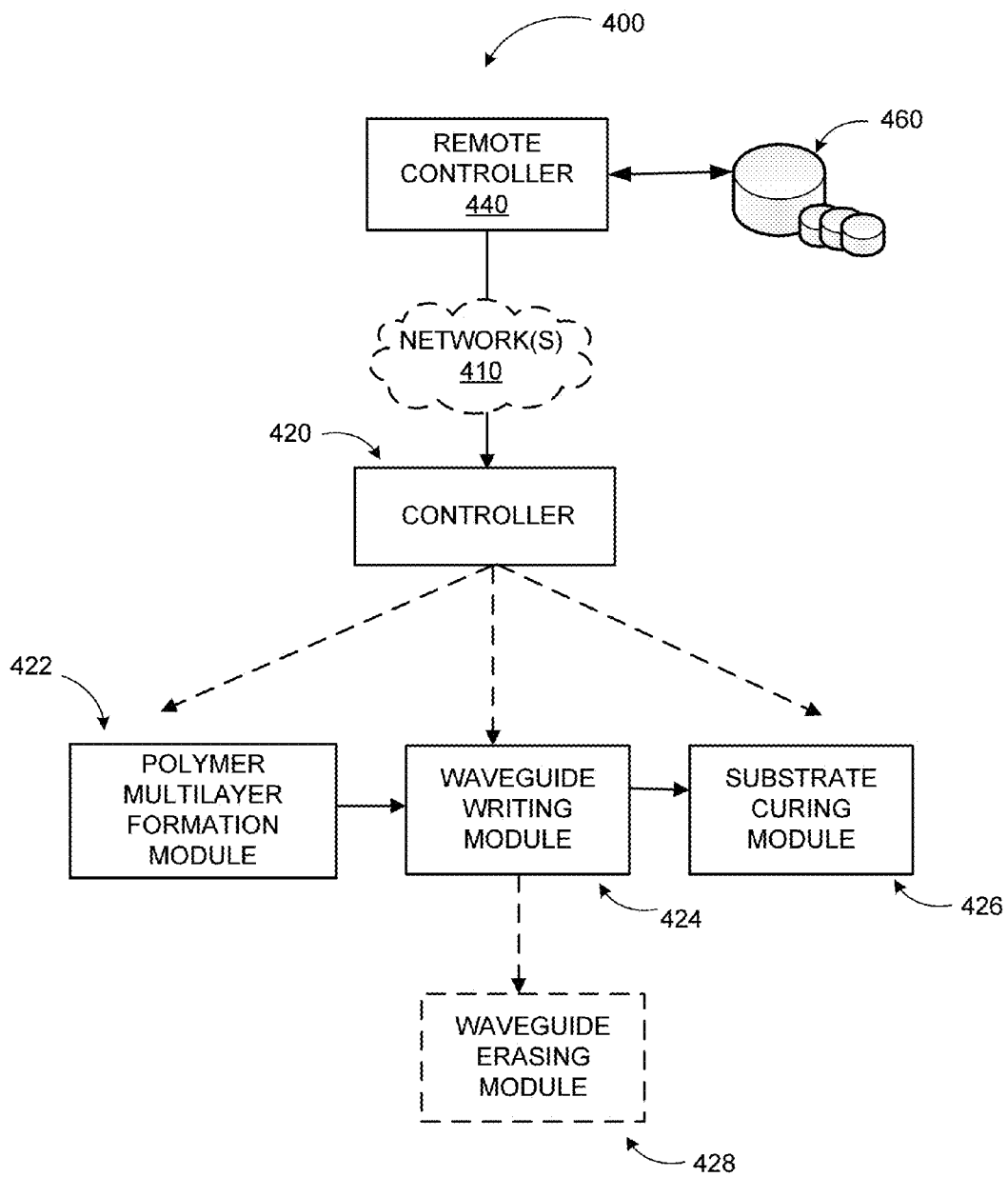
FIG. 4 illustrates an example system to form a waveguide in a polymer multilayer.

FIG. 4 illustrates an example system to form a waveguide in a polymer multilayer, arranged in accordance with at least some embodiments described herein.

System 400 may include at least one controller 420, at least one polymer multilayer formation module 422, at least one waveguide writing module 424, at least one substrate curing module 426, and at least one optional waveguide erasing module 428. The controller 420 may be operated by human control or may be configured for automatic operation, or may be directed by a remote controller 440 through at least one network (for example, via network 410). Data associated with controlling the different processes of production may be stored at and/or received from data stores 460.

The controller 420 may include or control the polymer multilayer formation module 422 configured to form a polymer multilayer comprising a first polymer layer and a second polymer layer, where the polymer multilayer may be formed on a substrate. The controller 420 may also include or control the waveguide writing module 424 configured to form a waveguide in the polymer multilayer such that the waveguide is formed on the substrate, and the substrate curing module 426 configured to cure the substrate. In some embodiments, the controller 420 may further include or control the optional waveguide erasing module 428 configured to erase the waveguide formed prior to the substrate being cured by the substrate curing module 426.

The polymer multilayer formation module 422 may be configured to form the polymer multilayer. The polymer multilayer may include a first polymer layer and a second polymer layer, where the first polymer layer may be laminated onto the second polymer layer in a stack formation. The first and second polymer layers may be selected based on a refractive index difference between the first and second polymer layers. For example, the first polymer layer may have a first refractive index and the second polymer layer may have a second refractive index, where the first refractive index is higher than the second refractive index. The first and second polymer layers may be further selected such that the first and second polymer layers are mutually soluble in response to a provision of heat. In some embodiments, the polymer multilayer formation module 422 may be further configured to form the polymer multilayer on a substrate, where the first polymer layer is formed on the substrate.

The waveguide writing module 424 may be configured to form the waveguide in the polymer multilayer such that the waveguide is formed on the substrate, the waveguide comprising first, second, and third cladding regions and a waveguide core. In other examples, the waveguide formed may be located within a sheet, the sheet including the waveguide and the polymer multilayer on each side of the waveguide. The waveguide writing module 424 may include a light source configured to direct a first light beam to form the first cladding region within the polymer multilayer, and a second light beam configured to form the second cladding region within the polymer multilayer in order to form the waveguide. The first and second cladding regions may be generally parallel to one another and elongated within the polymer multilayer comprising a mixture of the first and second polymer layers. The waveguide formed may further include the third cladding region and the waveguide core. The third cladding region may comprise a portion of the second polymer layer located between the first and second cladding regions, and the waveguide core may comprise a portion of the first polymer layer located between the first and second cladding regions.

The substrate curing module 426 may be configured to cure the substrate. Curing of the substrate may cause the waveguide formed to be permanently written into the polymer multilayer and/or substrate. The substrate curing module 426 may include an optical source or an electron beam source configured to cure an entirety of the substrate employing a blanket exposure or cure localized regions of the substrate employing a shadow mask exposure.

The optional waveguide erasing module 428 may be configured to erase the waveguide formed prior to the substrate being cured by the substrate curing module 426. The optional waveguide erasing module 428 may include a heat source, which may be an optical source, configured to provide heat to the polymer multilayer in order to destroy the waveguide core of the waveguide. As the polymer multilayer is heated, the first and second polymer layer may uniformly solubilize causing the waveguide core to be destroyed. The heat from the heat source may be rapidly provided to an entirety of the polymer multilayer at a temperature above the melting points of the first and second polymers essentially comprising the first and second polymer layers. Alternately, heat from the heat source may be provided locally to the first, second, and third cladding regions of the polymer multilayer in order to destroy the waveguide core without affecting other components of the polymer multilayer and/or substrate.

The examples in FIGS. 1 through 4 have been described using specific apparatuses, configurations, and systems to form a waveguide in a polymer multilayer that may optionally be erased. Embodiments to form and optionally erase a waveguide are not limited to the specific apparatuses, configurations, and systems according to these examples.

Figure 5:
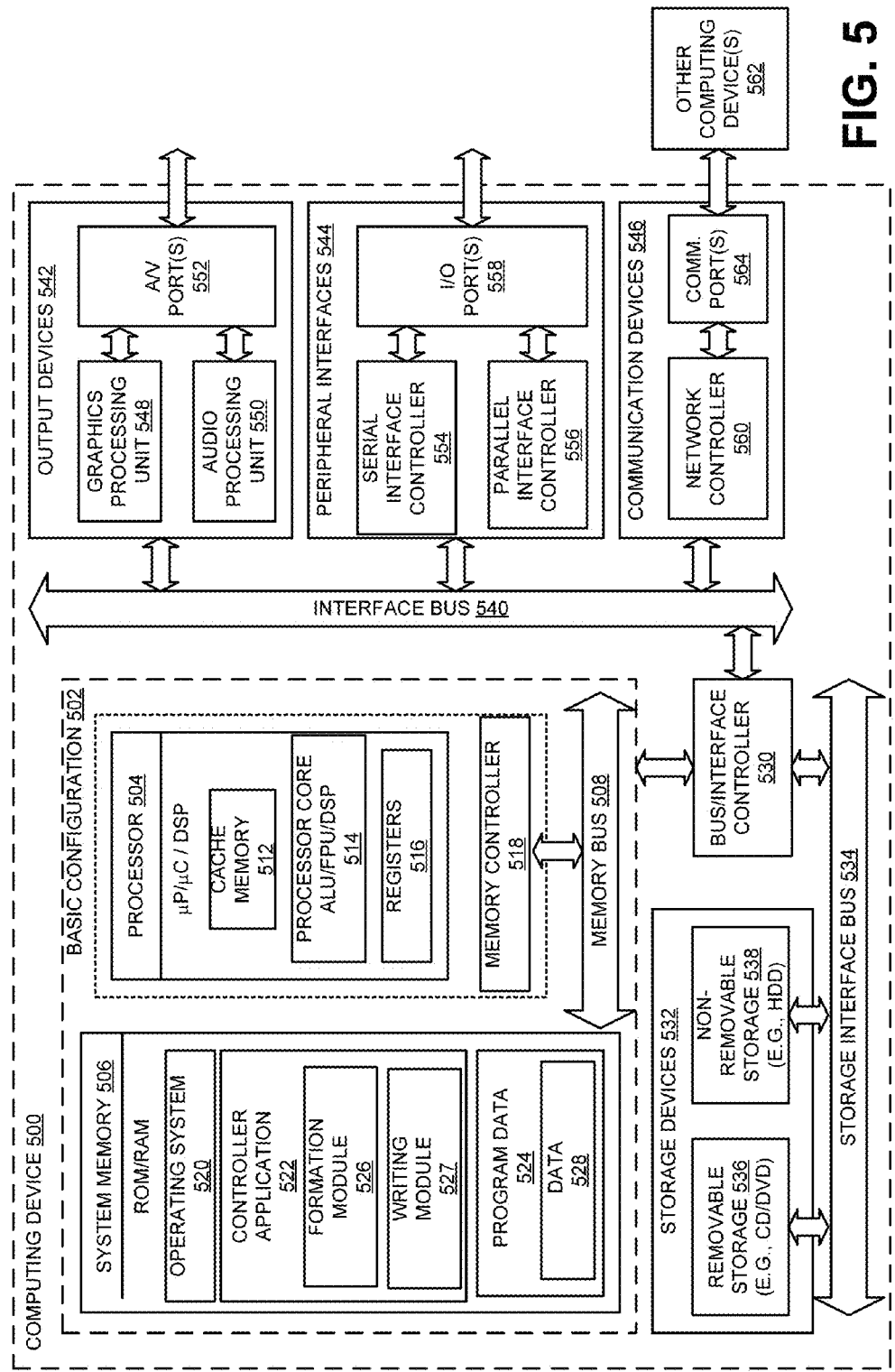
FIG. 5 illustrates a general purpose computing device, which may be used to control formation of a waveguide in a polymer multilayer.

FIG. 5 illustrates a general purpose computing device, which may be used to control formation of a waveguide in a polymer multilayer, arranged in accordance with at least some embodiments described herein.

For example, the computing device 500 may be used as a server, desktop computer, portable computer, smart phone, special purpose computer, or similar device such as a controller, a new component, a cluster of existing components in an operational system including a vehicle and a smart dwelling. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, an application 522, and program data 524. The application 522 may include a formation module 526 and a writing module 527, which may be an integral part of the application or a separate application on its own. The formation module 526 may be configured to form a polymer multilayer including a first polymer layer of higher refractive index, and a second polymer layer of lower refractive index. The writing module 527 may be configured to form a waveguide in the polymer multilayer, the formed waveguide comprising a waveguide core and a first, second, and third cladding region. The program data 524 may include, among other data, process data 528 related to formation of the polymer multilayer and formation of the waveguide in the polymer multilayer, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to form a waveguide in a polymer multilayer, where the waveguide may be optionally erased. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
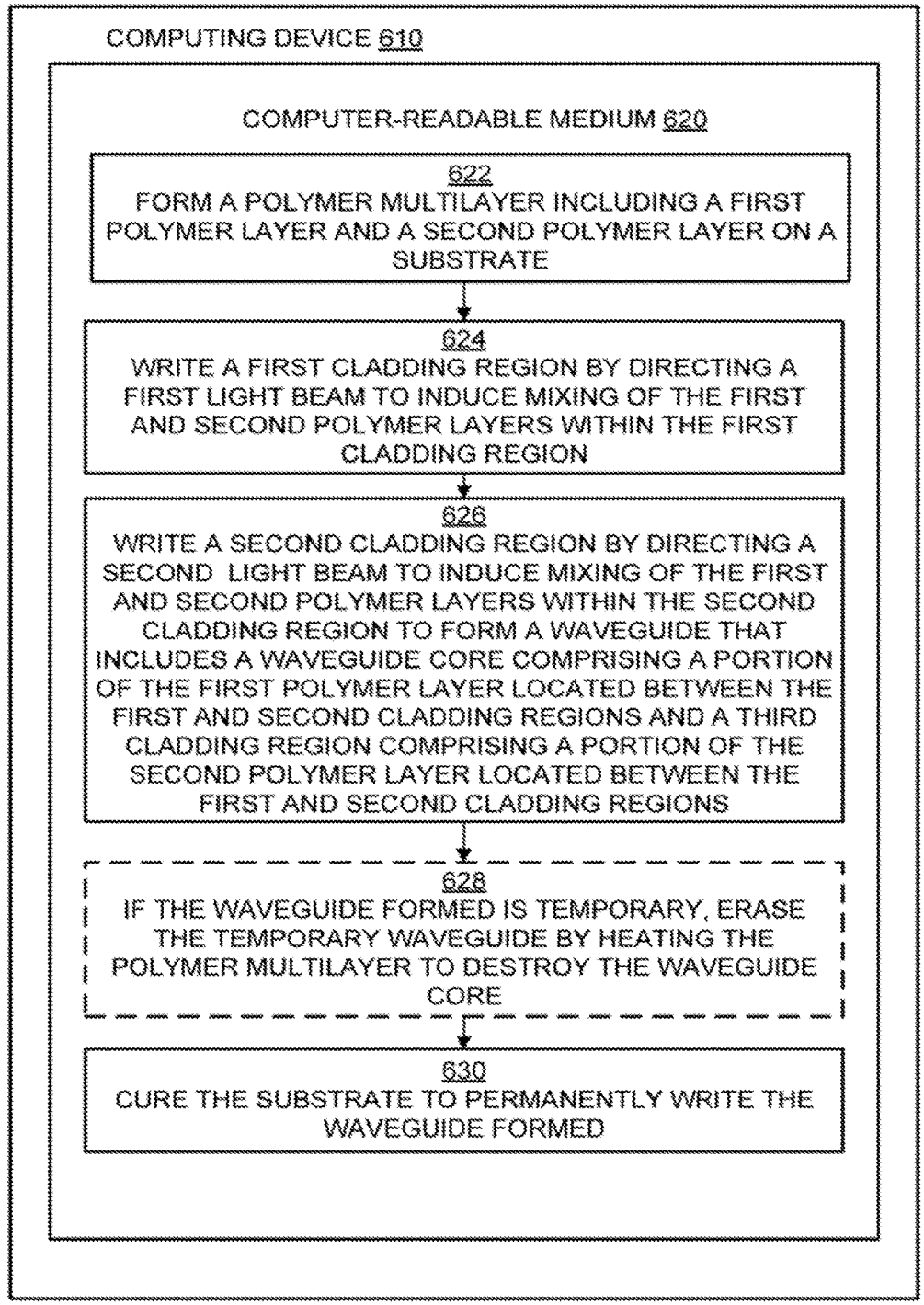
FIG. 6 is a flow diagram illustrating an example method to form a waveguide in a polymer multilayer that may be performed by a computing device such as the computing device in FIG. 7.

FIG. 6 is a flow diagram illustrating an example method to form a waveguide in a polymer multilayer that may be performed by a computing device such as the computing device in FIG. 5, arranged in accordance with at least some embodiments described herein.

Example methods may include one or more operations, functions or actions as illustrated by one or more of blocks 622, 624, 626, 628, and/or 630. The operations described in the blocks 622 through 630 may also be stored as computer-executable instructions in a computer-readable medium such as a computer-readable medium 620 of a computing device 610.

An example process to form a waveguide in a polymer multilayer may begin with block 622, "FORM A POLYMER MULTILAYER INCLUDING A FIRST POLYMER LAYER AND A SECOND POLYMER LAYER ON A SUBSTRATE," where a polymer multilayer formation module may laminate a first polymer layer onto a second polymer layer in a stack formation to form a polymer multilayer. The first and second polymer layers may be selected based on a difference in a refractive index between the first and second polymer layers. For example, the first polymer layer may have a first refractive index that is of higher refractive index than a second refractive index of the second polymer layer. The first and second polymer layers may be further selected such that the first and second polymer layers are mutually soluble. In some embodiments, the polymer multilayer may be formed on a substrate such that the first polymer layer is formed on the substrate.

Block 622 may be followed by block 624, "WRITE A FIRST CLADDING REGION BY DIRECTING A FIRST LIGHT BEAM TO INDUCE MIXING OF THE FIRST AND SECOND POLYMER LAYERS WITHIN THE FIRST CLADDING REGION," where a waveguide writing module may be configured to direct a first light beam from a light source to a first portion of the polymer multilayer. The light beam may induce mixing of the first and second polymer layers within the first portion of the polymer multilayer to write a first cladding region. The first cladding region may have a first cladding refractive index that is lower than the first refractive index of the first polymer layer and higher than the second refractive index of the second polymer layer.

Block 624 may be followed by block 626, "WRITE A SECOND CLADDING REGION BY DIRECTING A SECOND LIGHT BEAM TO INDUCE MIXING OF THE FIRST AND SECOND POLYMER LAYERS WITHIN THE SECOND CLADDING REGION TO FORM A WAVEGUIDE THAT INCLUDES A WAVEGUIDE CORE COMPRISING A PORTION OF THE FIRST POLYMER LAYER LOCATED BETWEEN THE FIRST AND SECOND CLADDING REGIONS AND A THIRD CLADDING REGION COMPRISING A PORTION OF THE SECOND POLYMER LAYER LOCATED BETWEEN THE FIRST AND SECOND CLADDING REGIONS," where the waveguide writing module may also be configured to direct a second light beam from a light source to a second portion of the polymer multilayer. The second light beam may induce mixing of the first and second polymer layers within the second portion of the polymer multilayer to write a second cladding region. The second cladding region may have a second cladding refractive index that is lower than the first refractive index of the first polymer layer and higher than the second refractive index of the second polymer layer. The first and second cladding region may be a pair of generally parallel and elongated regions within the polymer multilayer. The first and second cladding regions may be a mode-mixing region in a multi-mode interference coupler describing a rectangular region in a polymer multilayer. Accordingly, the writing of the first and second cladding regions may form a waveguide further comprising a third cladding region and a waveguide core. The third cladding region may be a portion of the second polymer layer located between the first and second cladding regions, where the third cladding refractive index is substantially equal to the second refractive index of the second polymer layer. The waveguide core may be a portion of the first polymer layer located between the first and second cladding regions, where the waveguide core refractive index is substantially equal to the first refractive index of the first polymer layer and thus is higher than the refractive index of the first, second, and third cladding regions.

Block 626 may be followed by optional block 628, "IF THE WAVEGUIDE FORMED IS TEMPORARY, ERASE THE TEMPORARY WAVEGUIDE BY HEATING THE POLYMER MULTILAYER TO DESTROY THE WAVEGUIDE CORE," where an optional waveguide erasing module may be configured to provide heat from a heat source to the first and second polymer layers of the polymer multilayer in order to destroy the waveguide core of the temporary waveguide. As the polymer multilayer is heated, the first and second polymer layer may uniformly solubilize causing the waveguide core to be destroyed. The heat from the heat source may be rapidly provided to an entirety of the polymer multilayer at a temperature above the melting points of the first and second polymers essentially comprising the first and second polymer layers. Alternately, heat from the heat source may be provided locally to the first, second, and/or third cladding regions of the polymer multilayer in order to destroy the waveguide core without affecting other components of the polymer multilayer and/or substrate.

Optional block 628 may be followed by block 630, "CURE THE SUBSTRATE TO PERMANENTLY WRITE THE WAVEGUIDE FORMED," where a substrate curing module may include an optical source or an electron beam source configured to provide light beams, laser beams, and/or electron beams to cure the substrate in order to cause the waveguide formed to be permanently written into the polymer multilayer and/or substrate. An entirety of the substrate may be cured employing a blanket exposure or localized regions of the substrate may be cured employing a shadow mask exposure.

The blocks included in the above described process are for illustration purposes. Formation of a waveguide in a polymer multiplayer may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 7 illustrates a block diagram of an example computer program product, all arranged in accordance with at least some embodiments described herein.

In some embodiments, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, a formation module 526 and a writing module 527 executed on the processor 504 may undertake one or more of the tasks shown in FIG. 7 in response to the instructions 704 conveyed to the processor 504 by signal bearing the medium 702 to perform actions associated with formation of a waveguide in a polymer multilayer as described herein. Some of those instructions may include, for example, one or more instructions to form a polymer multilayer including a first polymer layer and a second polymer layer on a substrate, write a first cladding region by directing a first light beam to induce mixing of the first and second polymer layers within the first cladding region, write a second cladding region by directing a second light beam to induce mixing of the first and second polymer layers within the second cladding region to form a waveguide that includes a waveguide core comprising a portion of the first polymer layer located between the first and second cladding regions and a third cladding region comprising a portion of the second polymer layer located between the first and second cladding regions, if the waveguide formed is temporary, erase the temporary waveguide by heating the polymer multilayer to destroy the waveguide core, and cure the substrate to permanently write the waveguide formed, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (for example, a fiber optic cable, a waveguide, a wired communications link, a wireless communication link, etc.). Thus, for example, the computer program product 700 may be conveyed to one or more modules of the processor 504 of FIG. 5 by an RF signal bearing medium, where the signal bearing medium 702 is conveyed by the wireless communications medium 710 (for example, a wireless communications medium conforming with the IEEE 802.11 standard).

In some examples, a method of using a temporary waveguide to test an optical component comprises: forming a temporary waveguide in a polymer multilayer by directing laser radiation towards the polymer multilayer to define cladding regions in the polymer multilayer, the cladding regions defining a waveguide core therebetween, the cladding regions comprising a mixture of polymer layers of the polymer multilayer; testing the optical component by directing light into the optical component using the temporary waveguide; and (optionally in some examples) erasing the temporary waveguide by heating the polymer multilayer to destroy the waveguide core. The optical component may be an optical coupler, such as one of an out-of-plane coupler, an in-plane Y-coupler, or more generally a multiport coupler. In some examples, the optical component may comprise a graded-index waveguide profile. In some examples, erasing the temporary waveguide by heating further comprises providing heat from one of a heat source and an optical source to uniformly solubilize the polymer layers of the polymer multilayer in order to destroy the waveguide core. In some examples, erasing the temporary waveguide may comprise providing heat from the heat source to an entirety of the polymer multilayer at a temperature above a melting point of the one or more, for example all, of the polymer layers of the polymer multilayer. The heat may be provided rapidly, for example so that the temporary waveguide is erased in 30 seconds or less. In some examples, erasing the temporary waveguide may comprise providing the heat from the optical source locally to the cladding regions of the polymer multilayer in order to destroy the waveguide core without affecting other components on the polymer multilayer. In some examples, a substrate may be used to support the polymer multilayer. For example, a substrate may be coated with a layer of the first polymer, and then a layer of the second polymer (or vice versa). In some examples, the two polymers are mutually miscible. A waveguide may be formed applying a laser, such as an IR laser, to form cladding regions surrounding the waveguide core. The lower index polymer may melt into the higher index polymer within the illuminated region. In some examples, the resulting cladding regions comprising a mixture of first and second polymers confine light in a core comprising a layer of substantially unmodified higher index polymer, which may be capped by a layer of lower index polymer also located between the cladding regions. In some examples, waveguide structures may be formed with a resolution of about 3 μm using a direct-write laser system with conventional motion control technology (in some cases, limited primarily by the diffraction limit of the IR light). In some examples, an interconnect, and any polymer multilayer based structure, can be made in a pre-processing step using a shadow mask and blanket flash IR exposure.

In some examples, a waveguide comprises a first cladding region, the first cladding region comprising a first mixture of a first polymer and a second polymer; a second cladding region, the second cladding region comprising a second mixture of the first polymer and the second polymer; and a waveguide core comprising the first polymer; wherein the waveguide core is located between the first cladding region and the second cladding region. In some examples, a third cladding region may comprise a layer of the second polymer located between the first cladding region and the second cladding region and adjacent the waveguide core. An optional fourth cladding region may comprise a layer of the second polymer located between the first cladding region and the second cladding region and adjacent the waveguide core, on the other side of the waveguide core than the third cladding region. In some examples, the first polymer has a first refractive index, the second polymer has a second refractive index, and the first refractive index is greater than the second refractive index. The first refractive index may be appreciably greater than the second refractive index, in some examples at least 0.05 greater, and in some examples at least 0.1 greater. The waveguide core has a core refractive index, and the core refractive index may be approximately equal to the first refractive index. In some examples, the first cladding region, the second cladding region, and optional additional cladding regions each have a refractive index less than the core refractive index. In some examples, a third cladding region has a third cladding refractive index substantially equal to the second refractive index. The first cladding region has a first cladding refractive index, the second cladding region has a second cladding refractive index, and the first cladding refractive index and the second cladding refractive index are both greater than the second refractive index and less than the first refractive index. In some examples, the first polymer may be an acrylate polymer, and may be a methacrylate polymer or other acrylate polymer derivative. In some examples, the second polymer may be a fluoropolymer. In some examples, the waveguide is located within a sheet, the sheet comprising the waveguide, the waveguide comprising a core region and cladding regions comprising first and second cladding regions disposed each side of the core region. The core region is located between the cladding regions, and includes the core and in some examples a low index (relative to the core) optical buffer region. In some examples, the refractive index step between the core and the surrounding cladding regions may be in the range 0.001-0.2, for example in the range 0.01-0.1, and for example in the range 0.01-0.03, or otherwise configured to provide good optical confinement. The sheet may further comprise polymer multilayer regions each side of the waveguide, for example adjacent each cladding region on the opposite side of the cladding region from the core region. In some examples, the core region may comprise a polymer multilayer similar to the polymer multilayers located on the other sides of the cladding regions, with the higher index layer providing the core and the lower index layer providing an index buffer layer. The polymer multilayer may comprise a first layer of the first polymer and a second layer of the second polymer, and may further comprise a third layer and optionally additional layers. Additional layers may be included for mechanical strength, optical isolation, or to provide additional layers supporting waveguides. The cladding regions may comprise a mixture of the first and second polymer layers, and have a refractive index intermediate the values for the first and second refractive index. The waveguide has an operating wavelength, or a range thereof, and may have an operating temperature or a range thereof. Refractive indices may be measured and compared at a convenient operating wavelength and/or operating temperature within an operating range thereof. In some examples, at least one of the first and second polymers includes dielectric nanoparticles. The nanoparticles may have a dimension, such as a diameter, less than an operating wavelength.

In some examples, a method of forming a waveguide in a polymer multilayer, the polymer multilayer comprising a first polymer layer and a second polymer layer, the first polymer layer having a first refractive index, the second polymer layer having a second refractive index, the second refractive index being lower than the first refractive index, wherein the method comprises: mixing the first and second polymer layers in a first portion of the polymer multilayer to form a first cladding region, the first cladding region having a first cladding refractive index less than the first refractive index; and mixing the first and second polymer layers in a second portion of the polymer multilayer to form a second cladding region, the second cladding region having a second cladding refractive index less than the first refractive index, the first and second cladding regions being spaced apart to form the waveguide, the waveguide further comprising a waveguide core comprising a portion of the first polymer layer located between the first cladding region and the second cladding region, and a third cladding region comprising a portion of the second polymer layer located between the first cladding region and the second cladding region. In some examples, the first and second cladding regions may be formed as a pair of generally parallel and elongated cladding regions within the polymer multilayer. Mixing the first and second polymer layers within the first and second portions of the polymer multilayer may comprise directing a laser beam at the first and second portions of the polymer multilayer. In some examples, a waveguide may be a waveguide formed by such example processes or any other process described herein.

Optical waveguides may be used in optoelectronic systems, for example as high capacity interconnects between components on a circuit board, between circuit boards, and for verification and test after assembly. Example waveguides, including temporary waveguides that are later erased, may be used as on-board test points to enable In-Circuit Testing (ICT) and Functional Verification Testing (FVT). Optical test points or ports may be removed by a waveguide erasing process after they have served their purpose. Example waveguides may be manufactured to the tolerances required for optical interconnects, may be readily integrated as an optical backplane for a circuit board, and can be configured to provide arbitrary waveguide connections, which may optionally be erased in whole or in part after assembly and testing is completed. Applications may also include optical routing of beams into an optoelectronic device, e.g. as used for direct writing of optical structures within the device.

An example polymer multilayer may comprise layers of polymeric materials with different refractive indices that are mutually soluble when heated. In some examples, the multilayer is a bilayer, having a first polymer layer and a second polymer layer. In some examples, a layer comprising a fluoropolymer, such as a VDF-based polymer or derivative thereof (e.g. PVDF), is formed on a substrate, and a layer comprising an acrylate polymer (such as PMMA) is formed on the fluoropolymer layer. The substrate is optional, and if used the substrate may optionally be removed after formation of the polymer multilayer. In some examples, an elongated strip of the acrylate polymer, such as PMMA, serves as the waveguide core. The fluoropolymer layer (or other low index polymer layer, relative to the acrylate polymer) may provide a lower index buffer layer adjacent the core, and may provide optical isolation of the core if the structure is bonded or otherwise attached to an external support or other layer. A waveguide core may be created by irradiating regions on either side of the core to form a pair of spaced apart cladding regions, with the core defined therebetween. Irradiation may use a laser, e.g. an IR laser, that locally heats and melts the polymer layers e.g. by selective laser melting, or using a shadow mask, to form a mixture of the polymers in the cladding regions. In some examples, the polymer layers may each have a thickness, for example, of 1-5 microns (such as approximately 2 microns thickness). In the case of a bilayer of PMMA (n=1.49, mp=160° C.) and PVDF (n=1.41, mp=177° C.) layers, the refractive index (n) of the cladding region may be approximately in the range n=1.45-1.46 (intermediate the values for the unmixed polymers), and the refractive index step between the core and the surrounding cladding regions may be in the range 0.02-0.03, which provides good confinement of the light within the waveguide structure.

According to some examples, methods to form a waveguide are provided. An example method may include providing a polymer multilayer. The polymer multilayer may include a first polymer layer and a second polymer layer, where the first polymer layer has a first refractive index and the second polymer layer has a second refractive index, the second refractive index being lower than the first refractive index. The example method may also include writing a first cladding region by directing a first light beam onto the polymer multilayer to induce mixing of the first and second polymer layers within the first cladding region, and writing a second cladding region by directing a second light beam on the polymer multilayer to induce mixing of the first and second polymer layers within the second cladding region, such that the waveguide is formed. A waveguide core may comprise a portion of the first polymer layer located between the first cladding region and the second cladding region, and a third cladding region may comprise a portion of the second polymer layer located between the first cladding region and the second cladding region.

In other examples, the polymer multilayer may be formed on a substrate, such that the waveguide is formed on the substrate. The substrate may be a backplane. The first polymer layer may be laminated to the second polymer layer. The first and second light beam may be provided in a visible, infrared, or ultraviolet light spectra. The first and second light beam may be provided by steering a laser beam. The laser beam may have a wavelength of about 390 nm to about 980 nm.

According to some embodiments, waveguides are described. An example waveguide may include a first cladding region formed by directing a first light beam to induce mixing of a first polymer layer and a second polymer layer within the first cladding region, and a second cladding region formed by directing a second light beam to induce mixing of the first and second polymer layers within the second cladding region. The example waveguide may also include a waveguide core comprising a portion of the first polymer layer located between the first cladding region and the second cladding region, and a third cladding region comprising a portion of the second polymer layer located between the first cladding region and the second cladding region.

In some embodiments, the first polymer layer may be formed on a substrate and the first polymer layer may laminated on the second polymer layer. The first and second polymer layers may be selected based on a refractive index difference between the first and second polymer layer, where a refractive index of the first polymer layer may be higher than a refractive index of the second polymer layer. The first polymer layer may include poly(methyl methacrylate) (PMMA). The second polymer layer may include polyvinylidene fluoride (PVDF).

In further embodiments, at least one of the first and second polymer layers may include nanoparticles configured to gel the at least one of the first and second polymer layers, where the nanoparticles comprise fumed silica, acidic silica, alumina, titania, or ceria. The first and second polymer layers may be mutually soluble in response to a provision of heat, where upon the provision of heat, uniform solubilization of the first and second polymer layers may destroy the waveguide core to effectively erase the waveguide.

According to some examples, systems configured to form a waveguide on a substrate are described. An example system may include a formation module configured to form a first polymer layer on the substrate, the first polymer layer having a first refractive index, and form a second polymer layer on the first polymer layer, the second polymer layer having a second refractive index, where the second refractive index may be lower than the first refractive index. The example system may also have a writing module configured to form a first cladding region by directing a first light beam to induce mixing of the first and second polymer layers within the first cladding region, and form a second cladding region by directing a second light beam to induce mixing of the first and second polymer layers within the second cladding region, the waveguide comprising the first and second cladding regions, a waveguide core comprising a portion of the first polymer layer located between the first cladding region and the second cladding region, and a third cladding region comprising a portion of the second polymer layer located between the first cladding region and the second cladding region. The example system may further include a controller configured to coordinate one or more operations of the formation module and the writing module.

In other examples, the example system may include an erasing module configured to erase the waveguide formed, if the waveguide formed is a temporary waveguide. The erasing module may include a heat source or an optical source configured to heat the first and second polymer layers to destroy the waveguide core in order to erase the temporary waveguide. The heat source may be configured to rapidly heat an entirety of the substrate at a temperature above a melting point of the first and second polymer layers. The optical source may be configured to locally heat the first, second, and third cladding regions of the temporary waveguide in order to destroy the waveguide core without affecting other components on the substrate. The example system may further include a curing module configured to permanently write the waveguide formed on the substrate. The curing module may include an optical source and/or an electron beam source configured to cure an entirety of the substrate employing a blanket exposure, and/or cure localized regions of the substrate employing a shadow mask exposure, respectively.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various compositions, methods, systems, and devices are described in terms of "comprising" various components or steps (interpreted as meaning "including, but not limited to"), the compositions, methods, systems, and devices can also "consist essentially of" or "consist of" the various components and steps, and such terminology should be interpreted as defining essentially closed-member groups."

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware would be possible in light of this disclosure.

The present disclosure is not to be limited in terms of the particular embodiments described in this application, which are intended as illustrations of various aspects. Many modifications and variations can be made without departing from its spirit and scope Functionally equivalent methods and apparatuses within the scope of the disclosure, in addition to those enumerated herein, will be possible from the foregoing descriptions. Such modifications and variations are intended to fall within the scope of the appended claims. The present disclosure includes the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to form a waveguide, the method comprising:
providing a polymer multilayer comprising a first polymer layer and a second polymer layer, wherein the first polymer layer has a first refractive index, and the second polymer layer has a second refractive index that is lower than the first refractive index;
writing a first overlapping portion of the first polymer layer and the second polymer layer by directing a first light beam onto the polymer multilayer to induce mixing of the first polymer layer and the second polymer layer within the first overlapping portion; and
writing a second overlapping portion of the first polymer layer and the second polymer layer by directing a second light beam on the polymer multilayer to induce mixing of the first polymer layer and the second polymer layer within the second overlapping portion to form the waveguide,
wherein the waveguide includes:
a waveguide core comprising a portion of the first polymer layer located between the first overlapping portion and the second overlapping portion, and
a portion of the second polymer layer located above the waveguide core and between the first overlapping portion and the second overlapping portion.

2. The method of claim 1, further comprising:
forming the polymer multilayer on a substrate, such that the waveguide is formed on the substrate.

3. The method of claim 2, wherein the substrate is a backplane.

4. The method of claim 1, further comprising:
laminating the first polymer layer to the second polymer layer.

5. The method of claim 1, further comprising:
providing the first and second light beam in a one of visible, infrared, or ultraviolet light spectra.

6. The method of claim 1, further comprising:
providing the first and second light beam by steering a laser beam.

7. The method of claim 6, wherein the laser beam has a wavelength of about 390 nm to about 980 nm.

8. A waveguide, comprising:
a first overlapping portion of a first polymer layer and a second polymer layer formed by directing a first light beam to induce mixing of the first polymer layer and the second polymer layer within the first overlapping portion;
a second overlapping portion of the first polymer layer and the second polymer layer formed by directing a second light beam to induce mixing of the first polymer layer and the second polymer layer within the second overlapping portion;
a waveguide core comprising a portion of the first polymer layer located between the first overlapping portion and the second overlapping portion;
a portion of the second polymer layer located above the waveguide core and between the first overlapping portion and the second overlapping portion.

9. The waveguide of claim 8, wherein the first polymer layer is formed on a substrate and the first polymer layer is laminated on the second polymer layer.

10. The waveguide of claim 8, wherein the first Polymer layer and the second polymer layer are selected based on a refractive index difference between the first and second polymer layer.

11. The waveguide of claim 10, wherein a refractive index of the first polymer layer is higher than a refractive index of the second polymer layer.

12. The waveguide of claim 8, wherein the first polymer layer comprises poly(methyl methacrylate) (PMMA).

13. The waveguide of claim 8, wherein the second polymer layer comprises polyvinylidene fluoride (PVDF).

14. The waveguide of claim 8, wherein at least one of the first polymer layer and the second polymer layer include nanoparticles configured to gel the at least one of the first polymer layer and the second polymer layer.

15. The waveguide of claim 14, wherein the nanoparticles comprise fumed silica, acidic silica, alumina, titania, or ceria.

16. The waveguide of claim 8, wherein the first polymer layer and the second polymer layer are mutually soluble in response to a provision of heat.

17. The waveguide of claim 16, wherein upon the provision of heat, uniform solubilization of the first polymer layer and the second polymer layer destroys the waveguide core to effectively erase the waveguide.

18. The method of claim 1, further comprising:
permanently writing the waveguide formed employing one of a blanket exposure and a shadow mask exposure.

19. The method of claim 1, further comprising:
applying heat from one of a heat source and an optical source to the first polymer layer and the second polymer layer to destroy the waveguide core to effectively erase the waveguide formed.

* * * * *

UNITED STATES PATENT AND TRADEMARK OFFICE
CERTIFICATE OF CORRECTION

| | | |
|---|---|---|
| PATENT NO. | : 9,575,250 B2 | Page 1 of 1 |
| APPLICATION NO. | : 14/324074 | |
| DATED | : February 21, 2017 | |
| INVENTOR(S) | : Miller et al. | |

It is certified that error appears in the above-identified patent and that said Letters Patent is hereby corrected as shown below:

In the Specification

In Column 13, Line 18, delete "by signal bearing the medium" and insert -- by the signal bearing medium --, therefor.

In the Claims

In Column 22, Line 21, in Claim 8, delete "portion;" and insert -- portion; and --, therefor.

In Column 22, Line 28, in Claim 10, delete "first Polymer" and insert -- first polymer --, therefor.

Signed and Sealed this
Twenty-third Day of May, 2017

Michelle K. Lee
*Director of the United States Patent and Trademark Office*